United States Patent [19]

Wirth

[11] Patent Number: 5,152,158
[45] Date of Patent: Oct. 6, 1992

[54] APPARATUS FOR MEASURING AND CONTROLLING THE AMOUNT OF YARN WITHDRAWN FROM A WARP BEAM OF A WARP KNITTING MACHINE

[75] Inventor: Rudi Wirth, Schwarzenbach/Wald, Fed. Rep. of Germany

[73] Assignee: Liba Maschinenfabrik GmbH, Fed. Rep. of Germany

[21] Appl. No.: 700,482

[22] Filed: May 15, 1991

[30] Foreign Application Priority Data

May 16, 1990 [DE] Fed. Rep. of Germany ....... 4015784

[51] Int. Cl.$^5$ .............................................. D04B 27/10
[52] U.S. Cl. ........................................ 66/212; 33/734; 33/778
[58] Field of Search ..................... 66/212, 209; 33/734, 33/735, 736, 737, 743, 747, 748, 749, 775, 778, 779, 738, 739, 740, 741, 742, 744, 745, 746, 772, 773, 774, 776, 777; 26/70

[56] References Cited

U.S. PATENT DOCUMENTS

| | | | |
|---|---|---|---|
| 2,400,525 | 5/1946 | Amidon | 66/212 |
| 2,674,109 | 4/1954 | Bassist | 66/212 |
| 2,871,685 | 2/1959 | Bassist | 66/212 |
| 3,539,782 | 11/1970 | Upshur | 66/212 |
| 3,727,033 | 4/1973 | Bassist | 66/212 |
| 3,781,532 | 12/1973 | Dorsman et al. | 66/212 |
| 3,930,523 | 1/1976 | Garcia | 66/212 |

FOREIGN PATENT DOCUMENTS

| | | | |
|---|---|---|---|
| 156088 | 4/1954 | Australia | 66/212 |
| 1414474 | 11/1975 | United Kingdom | 66/212 |

*Primary Examiner*—Werner H. Schroeder
*Assistant Examiner*—Larry D. Worrell, Jr.
*Attorney, Agent, or Firm*—Bell, Seltzer, Park & Gibson

[57] ABSTRACT

An apparatus for measuring and controlling the amount of yarn withdrawn from the warp beam of a warp knitting machine is disclosed. A pressure roll engages the yarn wound on the warp beam. The pressure roll drives a second drive roll connected to a signal generator for generating signals representative of the speed of yarn withdrawn from the warp beam. The signals preferably are evenly spaced yarn length pulses representing a measure of the length of yarn withdrawn from the warp beam. The pulses are transmitted to a controller circuit which compares the generated pulses with a predetermined knitting machine operating standard and generates a control signal to the warp beam drive mechanism for controlling rotation of the warp beam. The drive roll preferably is manufactured with a wear-resistant surface and the diameter of the drive roll is dimensioned so that the evenly distributed yarn length pulses represent a yarn length corresponding to a fraction of a minimal racking movement of the yarn laying bars in the warp knitting machine.

9 Claims, 4 Drawing Sheets

APPARATUS FOR MEASURING AND CONTROLLING THE AMOUNT OF YARN WITHDRAWN FROM A WARP BEAM OF A WARP KNITTING MACHINE

FIELD OF THE INVENTION

This invention relates to an apparatus for measuring and controlling the amount of yarn withdrawn from the warp beam of a warp knitting machine by generating signals representative of the length of yarn withdrawn from the warp beam and comparing the generated signals to a predetermined knitting machine operating standard.

BACKGROUND OF THE INVENTION

In one known apparatus for measuring the amount, that is, the length of yarn withdrawn from the warp beam of a warp knitting machine, a pressure roll engages the warp beam to rotate with the warp beam as the warp beam is rotated. The pressure roll drives directly a tachogenerator which produces a signal corresponding to the speed of the yarns as they are withdrawn from the warp beam, and, thus, the amount of yarns which have been withdrawn from the warp beam. In the apparatus, the tachogenerator includes a digital pulse generator having output pulses which are spaced a distance corresponding to the respective length of delivered yarn. To prevent damage to yarns wound on the warp beam by contact of the pressure roll, the contact pressure roll is normally formed from a relatively soft rubber. The pulses emitted by the pulse generator are compared with a predetermined pulse train to derive from the comparison a measure for controlling the rotation of the warp beam. The pressure roll includes an output shaft acting as a direct drive of the pulse generator.

This type of yarn measuring apparatus in which the soft pressure roll contacts the actual yarn on the warp beam has several drawbacks. The resistance imparted onto the pressure roll by the pulse generator connected directly to the pressure roll shaft may cause slippage of the yarns. If slippage occurs, the generated output pulses will not accurately represent the actual yarn withdrawn from the warp beam. Additionally, slippage creates wear on the pressure roll resulting in inaccurate measured and calculated results because the number of generated output pulses is determined by the number of rotations of the pressure roll. Wear decreases the diameter of the roll resulting in an increased number of pulses per revolution of the roll. Thus, the measured amount of yarn withdrawn from the warp beam will be higher than the actual amount withdrawn when the pressure roll is withdrawn.

SUMMARY OF THE INVENTION

It is therefore an object of the present invention to provide an apparatus for measuring and controlling the amount of yarn withdrawn from the warp beam of a warp knitting machine having a pressure roll engaging the warp beam and a pulse generator operatively connected to the pressure roll and in which the generated signals representative of the amount of withdrawn yarn is not affected by the wear and diameter change of the pressure roll.

It is another object of the present invention to provide an apparatus for measuring and controlling the amount of yarn withdrawn from the warp beam of a warp knitting machine having a pressure roll engaging the warp beam and a pulse generator operatively connected to the pressure roll and in which the pressure roll does not directly drive the pulse generator.

It is another object of the present invention to provide an apparatus for measuring and controlling the amount of yarn withdrawn from the warp beam of a warp knitting machine having a pressure roll engaging the warp beam and a pulse generator operatively connected to the pressure roll so that an accurate drive of the pulse generator is ensured over long lengths of operating times and so that the yarn length pulse emitted by the pulse generator enable an accurately controlled rotation of the warp beam.

In accordance with the present invention, the pressure roll contacting the warp beam is used as an intermediate roll for driving free of slippage a second drive roll which engages and drives the pulse generator. Because the pressure roll is an intermediate roll between the warp beam and drive roll, the pulse generator operates independent of changes in the diameter of the pressure roll resulting from wear such as caused by slippage or other factors.

Additionally, the present invention advantageously permits manufacture of the drive roll with 1) a wear-resistant surface and 2) a predetermined diameter. Thus, the yarn length pulses generated by the pulse generator may represent a predetermined yarn length withdrawn from the warp beam. Because a more accurate measurement of the actual amount of yarn is obtained, the invention facilitates greater control over the respective laying or patterning of yarn during knitting.

As noted above the drive roll does not contact the warp beam because the pressure roll is used as the intermediate roll. The drive roll can be manufactured of a material having a hard surface to resist wear. Thus, it is possible to maintain greater accuracy in the diameter of the drive roll so that over long operation periods, the drive roll maintains its diameter. As a result, the yarn length is measured with an unchanging accuracy because the peripheral speed of the drive roll rotates at the peripheral speed of the warp beam yarn no matter what the diameter of the intermediate pressure roll may be as it changes through wear. Even when the diameter of the pressure roll becomes smaller as a result of wear, the pressure roll, as an intermediate roll, accurately transmits to the drive roll in a slip-free manner the speed and thus the actual length of yarn withdrawn from the warp beam.

To prevent undesired disengagement of the pressure roll from the warp beam, the support means includes a support arm pivotally mounted on the frame. A lever arm is pivotally mounted on the support arm. The pressure roll is rotatably mounted on the lever arm, and a spring is supported on the support arm and connected to the lever arm for biasing the lever arm in a direction toward the warp beam. The support arm is pivotally movable from an operative position in which the support arm is pivoted inward toward the warp beam and the pressure roll is biased against the periphery of the warp beam, and an inoperative position in which the support arm is pivoted outward from the warp beam so that the pressure roll is unengaged with the warp beam. The support arm also is movable into an intermediate position in which the pressure roll is engaged in unbiased condition against the warp beam.

A limit switch is carried by the support arm. The limit switch includes open and closed positions and is connected to the warp beam knitting machine for stopping knitting on the machine when the limit switch is open. The limit switch is closed when the support arm is in an operative position. The limit switch is open when the support arm is in the intermediate and inoperative positions.

The support arm includes at least one stop member for engaging the lever arm and forcing the lever arm against the warp beam when the support arm is positioned in the operative position. The limit switch preferably is positioned on the stop member so that when the support arm is moved into the intermediate position such as when an unwanted or undesired swinging movement of the support arm occurs, the lever arm disengages from the limit switch and the stop member. The limit switch opens, stopping the warp knitting machine. As a result, control over the warp knitting machine is facilitated.

BRIEF DESCRIPTION OF THE DRAWINGS

Some of the objects and advantages of the present invention having been stated, others will appear as the description proceeds, when taken in conjunction with the accompanying drawings, in which.

DETAILED DESCRIPTION OF THE PREFERRED EMBODIMENT

Figure 1:
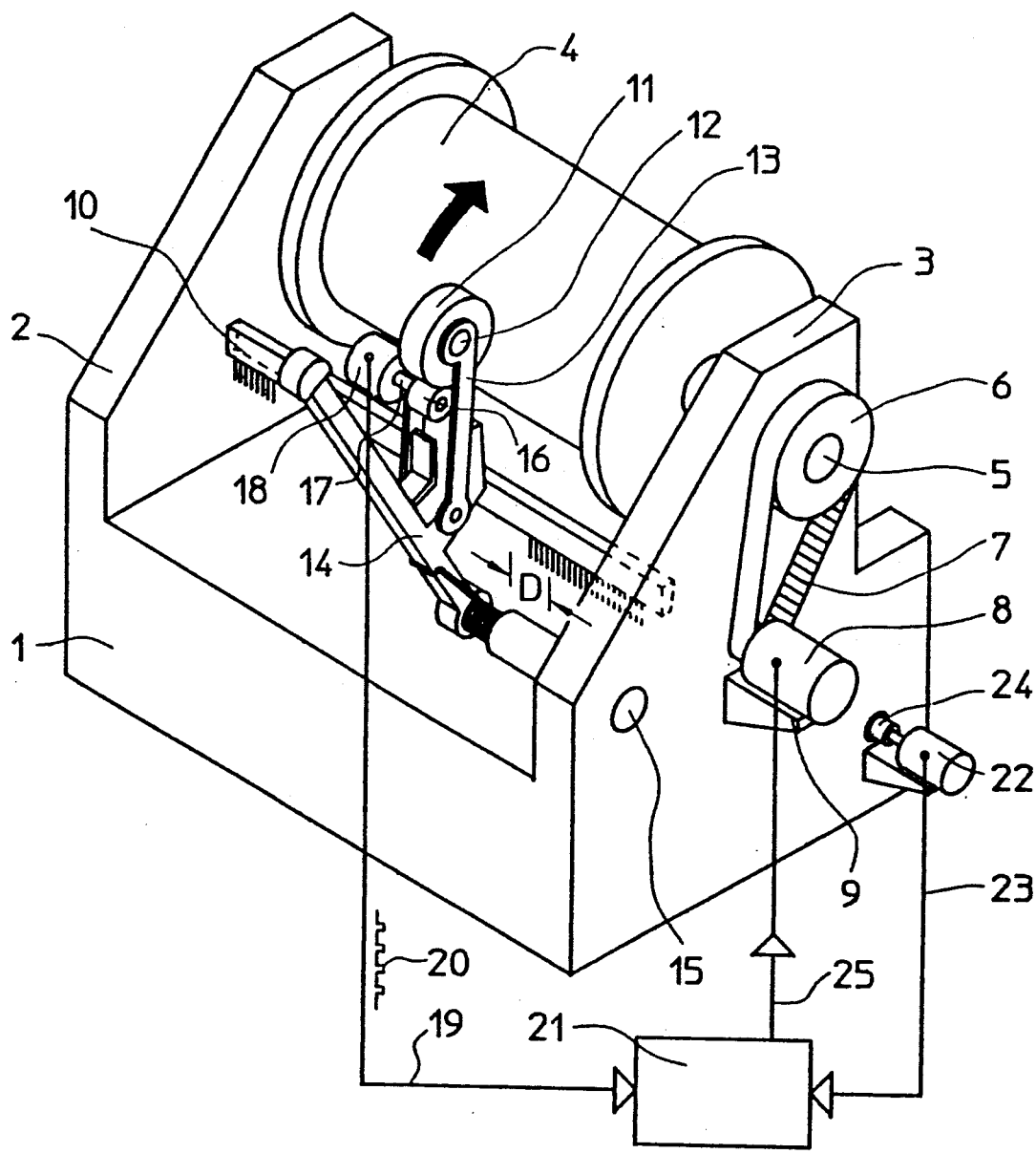
FIG. 1 is an isometric view of a portion of a warp knitting machine and showing a warp beam and pressure roll.

FIG. 1 is an isometric view of a portion of the warp knitting machine in accordance with the present invention in which a knitting machine frame 1, with side walls 2 and 3, supports a conventional warp beam 4. A support shaft 5 of the warp beam 4 extends through the side wall 3. A toothed belt pulley 6 is secured on the shaft 5 and connected, via a toothed belt 7, to the warp beam drive motor 8. The warp beam drive motor 8 is secured to the side wall 3 by a bracket 9.

Between the side walls, 2 and 3, a conventional yarn laying bar 10 extends. The yarn laying bar 10 is supported on the side walls, 2 and 3, in a conventional manner not shown here in detail. Normally, warp knitting machines are equipped with several yarn laying bars 10. The yarn laying bar 10 is movable in a longitudinal direction and performs a racking movement in the longitudinal direction as indicated by the distance "D".

A pressure roll 11 enqages the yarn wound on the Warp beam 4 The pressure roll 11 is driven by the warp beam 4 free of slippage as a result of its friction against the warp beam 4 so that the peripheral surface movement of the warp beam 4 during its rotation is fully transmitted to the pressure roll 11. The pressure roll li is supported for rotation on a shaft 12 carried by a lever arm 13. The lever arm 13 is pivotally mounted on the support arm 14. The support arm 14 is supported on the side wall 3 by a shaft 15. The interaction of leVer arm 13 and support arm 14 Will be described below in more detail with reference to FIGS. 2–4.

A drive roll 16 engages the pressure roll 11 and is driven free of slippage by the pressure roll 11 operating as an intermediate roll. As the warp beam 4 rotates, it drives the pressure roll 11, which transmits, free of slippage, its rotative motion to the drive roll 16 so that the distance corresponding to the actual amount of yarn withdrawn from the surface of the warp beam 4 is transmitted to the drive roll 16. Because an intermediate roll, the pressure roll 11, engages the warp beam and the drive roll, the drive roll 16 peripheral surface rotation corresponds to the surface distance or length of yarn withdrawn from the warp beam.

The drive roll 16 is connected by its output shaft 17 to a signal generator 18 secured on the lever arm 13. The signal generator 18 generates signals representative of the speed at which the yarn is withdrawn as a function of the progressive movement of the surface of warp beam 4 and thus indicates the length of yarn withdrawn from the warp beam. The signal generator preferably generates a predetermined number of evenly spaced yarn length pulses for each revolution of the drive roll 16. Each yarn length pulse 20 represents a measured length of yarn withdrawn from the warp beam 4. Alternatively, the signal generator may emit a voltage or other electric potential as in some conventional tachogenerators.

The generated yarn length pulses 20 are input through data communication line 19 to a control circuit 21 such as a conventional controller haVing conventional microprocessor hardware. The generated pulses are compared by the controller 21 with a predetermined knitting machine operating standard and a control signal is generated to the warp beam drive mechanism for controlling the drive, and thus the speed at which the yarn is withdrawn from the warp beam. The predetermined standard may be derived from various factors such as the type of knit, the amount of yarn which must be fed p̄er individual course, or other knitting machine factors. In the illustrated embodiment the predetermined standard is described as the known, desired speed of the warp knitting machine operation as now will be described in detail.

The controller 21 receives in known manner a pulse train qenerated by a pulse generator 22 driven by the main shaft 24 of the warp knitting machine. The pulses are generated through a data communication line 23. As a result of supplying the pulse trains to the controller 21, the controller generates in known manner a control signal through the data communication line 25. This signal controls the drive motor 8 of the warp beam 4 to adjust the desired yarn feed from the warp beam 4.

Preferably, the drive roll 16 is made from a hard material or it is made with a hardened surfaoe so that the drive roll resists wear on its surface as it is driven by the pressure roll 11 over long operating periods. Because the pulse generator is not directly driven by the pressure roll 11, wear does not affect the number of pulses generated as yarn is withdrawn from the warp beam. Likewise, when the diameter of the pressure roll 11 is reduced by wear, the drive roll 16 peripheral surface always reflects the distance traveled by the surface of the warp beam 4. The drive roll 16 is always driven free of slippage.

The invention provides for the manufacture of the drive roll 16 with a configuration independent of wear on the pressure roll 11. Also it is possible to impart to the drive roll any desired diameter. Preferably, the drive roll 16 is formed with a predetermined diameter in which each yarn length pulse that is generated uniformly by each rotation of the drive roll 16 corresponds to a fraction of a minimal racking movement of the yarn laying bar 10. For example, minimal yarn laying movements in a range of 1 mm are possible on some conventional warp knitting machines. It is useful to select the drive roll 16 having a diameter so that the number of yarn length pulses 20 generated per rotation of the drive roll 16 results in a spaoinq of the pulses corresponding to an approximate 0.1 mm length of yarn withdrawn from the warp beam 4. It is possible also to space the yarn length pulses 20 closer together when using a smaller diameter drive roll 16. This would amount to each yarn length pulse 20 representing a shorter length of the yarns withdrawn from the warp beam 4. In this manner, it is possible to increase the accuracy of control over the rotation of the warp beam 4. This is important when the racking moment of the yarn laying bar 10 and the processing of the yarn for each course of stitch loops results in shorter yarn lengths being supplied during each rotation of the main shaft 24.

Figures 2, 2A:
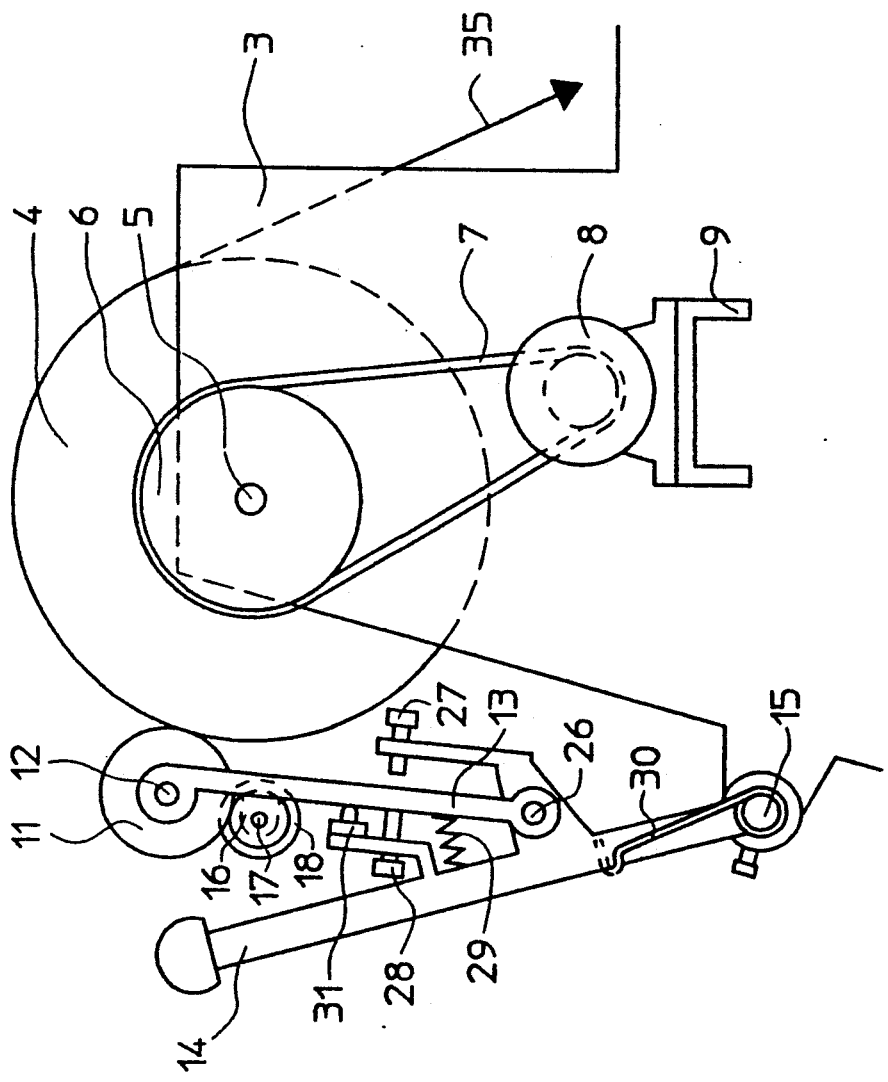
FIG. 2 is a side elevational view of the warp beam and pressure roll in the operative position.
FIG. 2a is an enlarged view of the closed limit switch.
Figure 3:
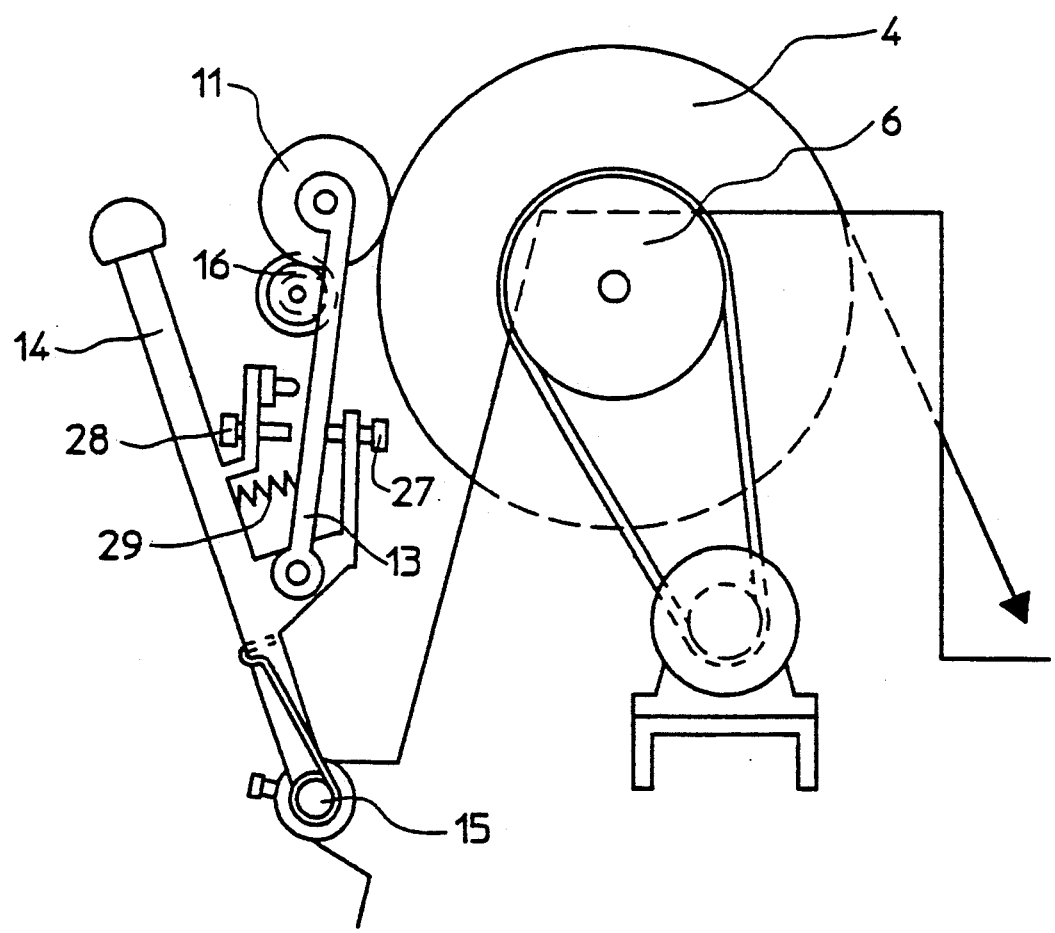
FIG. 3 is a side elevational view similar to FIG. 2 showing the pressure roll engaging the warp beam and the support arm in an intermediate position.
Figure 4:
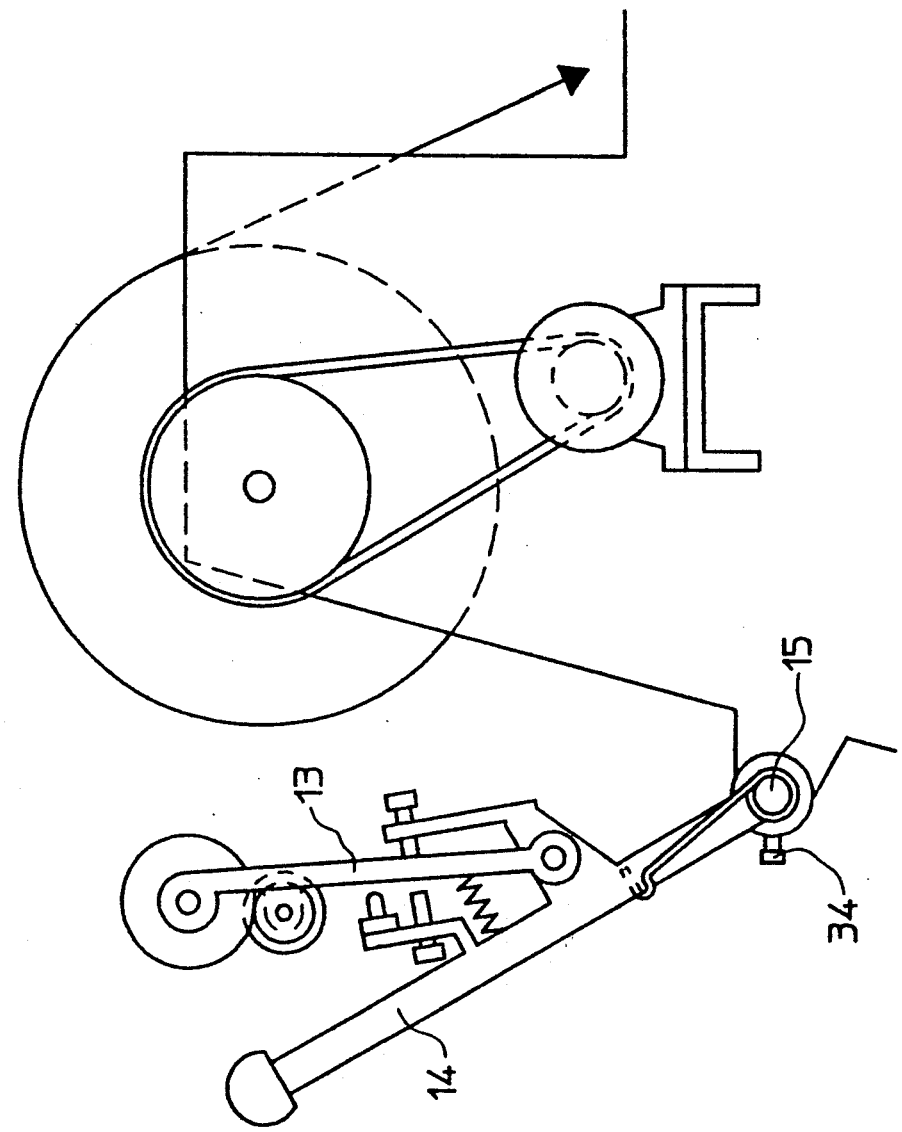
FIG. 4 is a side elevational view similar to FIG. 2 showing the pressure roll disengaged from the warp beam and the support arm in an inoperative position.

Reference is now made to FIGS. 2–4, which are more detailed views of the support means for the support arm 14 and other structural components supporting the pressure roll in engagement to the warp beam.

FIG. 2 is a side elevational view of FIG. 1 showing the warp beam 4 the warp beam drive meohanism, the support arm 14 and lever arm 13. In FIG. 2 the support arm 14 is in its operative position. The pressure roll 11 engages the peripheral surface of the warp beam 4 and is driven by the warp beam. As explained before with reference to FIG. 1, the pressure roll 11 transmits the warp beam rotation to the drive roll 16. The pressure roll 11 and drive roll 16 are supported on the lever arm 13 which is pivotally connected to the support arm 14 for pivotal moVement about a shaft 26 on which the lever arm 13 is connected.

The lever arm 13 can be pivoted forward and backward between the stops 27 and 28. A spring 29 is connected between the lever arm 13 and support arm 14 and biases the lever arm in a direction toward the warp beam 4. The support arm 14 is biased by a spring 30 in a direction toward the warp beam 4. The spring 30 exerts a greater biasing force than the spring 29 so that the biasing force exerted by the spring 30 overcomes the biasing force of the spring 29. In the illustrated operative position of FIG. 2, the pressure roll 11 is positioned against the warp beam 4 and the lever arm 13 is positioned against the stop member 28, thereby limiting the amount of angular, pivotable movement of the support arm 14 in the direction of the warp beam 4.

As illustrated, a limit switch 31 is secured to the support arm 14 adjacent the stop member 28. The limit switch 31 includes a plunger 32 (see enlarged view of FIG. 2a) which is pushed inward by the lever 13, thereby closing the contact 33 of the limit switch 31. The closing of contact 33 can be used, for example, to start and maintain the warp knitting machine in operation. When the support arm 14 is pivoted slightly away from the warp beam 4, such as occurring when the warp beam is changed or the pressures exerted during knitting move slightly the arm, the support arm 14 assumes an intermediate or off-position as shown in FIG. 3. The lever arm 13 is pivoted from the support arm 14 by the spring 29. 1n this intermediate position, the pressure roll 11 remains in contact with the warp beam 4 and the pivotal movement of the lever arm 13 is limited by the stop 27, as shown in FIG. 3.

Figure 4A:
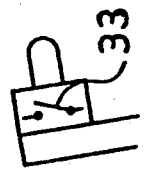
FIG. 4a is an enlarged view of the open limit switch.

In this intermediate position the pressure roll 11 continues to contact the warp beam 4 so that the generation of the yarn length pulses 20 effected by the drive roll 16 is maintained. HoWeVer, When the lever arm 13 pivots away from the stop 28 as the support arm 14 moves into the intermediate position, the plunger 32 is released and the contact 33 opens (see enlarged view of FIG. 4a). When the contact 33 opens, operation of the warp knitting machine is terminated, but the pressure roll 11 continues to engage the warp beam 4. This is advantageous because the pulse generation is maintained when the knitting machine operation is terminated. As a result, continued control of the yarn feed is not interrupted before the operation of the warp knitting machine is terminated. When the support arm 14 is further pivoted to the position shown in FIG. 4, the pressure roll 11 disengages from the warp beam 4, thereby terminating rotation of the drive roll 16 and interrupting the delivery of the yarn length pulses 20.

A drop-in pin 34 positioned on the bearing of the shaft 15 engages the support arm 14 in the inperative position shown in FIG. 4 to maintain the support arm in this position against the biasing force exerted by the spring 30 against the support arm 14. If several warp beams or yarn laying bars are used, a plurality of the yarn feed measuring apparatus shown in FIGS. 2–4 are provided, thus allowing control over withdrawal of yarns 35 from each warp beam.

The present invention offers several benefits over other prior art apparatus which control the yarn delivered from the warp beam of a warp knitting machine. The pressure roll provides an intermediate roll between the warp beam and the drive roll connected to the signal generator so that the actual amount of yarn withdrawn from the warp beam is accurately reflected in the rotation of the drive roll. Thus, accurate pulse generation is not dependent on the diameter of the pressure roll which constantly changes through wear. The diameter of the drive roll may be chosen so that each pulse generated delineates predetermined yarn withdrawal lengths.

While a specific embodiment of the invention has been specifically shown and described, it will be understood that this was for purposes of limitation only, and not for purposes of limitation, the scope of the invention being in accordance with the following claims.

The which is claimed is:

1. An apparatus for measuring and controlling an amount of yarn withdrawn from a warp beam of a warp knitting machine having a frame for supporting the warp beam, a drive mechanism for rotating the warp beam during knitting, and comprising a pressure roll, support means pivotally connected to the frame and rotatably supporting the pressure roll for movement into an operative position in which the pressure roll engages the circumferential yarn surface of the warp beam so that the pressure roll rotates as the warp beam rotates and yarn is withdrawn from the warp beam, a drive roll rotatably mounted on the support means and wherein the periphery of the drive roll frictionally engages the periphery of the pressure roll for rotating with the pressure roll as yarn is withdrawn from the warp beam, a signal generator operatively connected to the drive roll for generating signals representative of the speed of yarn withdrawn from the warp beam, a controller operatively connected to said signal generator and said drive mechanism for receiving the generated signals and comparing the generated signals to a predetermined knitting machine operating machine standard for controlling the drive mechanism and varying the rotational speed of the warp beam and resultant yarn withdrawal rate therefrom, and wherein the drive roll diameter is dimensioned so that each rotation of the drive roll corresponds to a predetermined length of yarn withdrawn from the warp beam.

2. The apparatus according to Claim 1 wherein the signal generator comprises a signal pulse generator for generating a predetermined number of pulses for each rotation of the drive roll and wherein each generated pulse corresponds to a predetermined length of yarn withdrawn from the warp beam.

3. The apparatus according to claim 2 wherein the warp knitting machine includes at least one yarn laying bar movable in increments in a longitudinal direction to provide a racking movement on the warp knitting machine, and wherein the drive roll is dimensioned so that each generated pulse from the pulse generating means corresponds to a length of withdrawn yarn equal to a fractional amount less than one, of the length of a minimal racking movement in the warp knitting machine.

4. The apparatus according to claim 1 wherein the warp knitting machine includes a main drive shaft, and pulse generating means operatively connected to the main drive shaft and the controller for generating a predetermined number of pulse to the controller indicative of the operating speed of the warp knitting machine, and wherein said predetermined standard is the number of pulses corresponding to the desired operating speed of the warp knitting machine.

5. The apparatus according to claim 1 wherein the outer surface of the pressure roll is formed of a soft material such as rubber to prevent damage to the yarns wound on the warp beam, and wherein the outer surface of the drive roll is formed of a material which resists wear.

6. The apparatus according to claim 1 wherein said support means includes a support arm pivotally mounted on the frame, a lever arm pivotally mounted on the support arm, and wherein said pressure roll is rotatably mounted on the lever arm, means supported by said support arm and connected to said lever arm for biasing said lever arm in a direction toward said warp beam, and wherein said support arm is pivotally movable from an operative position where the support arm is pivoted inward toward the warp beam and the pressure roll is biased into engagement with the warp beam, and an inoperative position where the support arm is pivoted outward from the warp beam and the pressure roll is disengaged from the warp beam.

7. The apparatus according to claim 6 wherein said support arm is movable into an intermediate position rearward from the operative position and in which the pressure roll is engaged in with the warp beam.

8. The apparatus according to claim 7 including a limit switch carried by said support arm, said limit switch having open and closed positions and being operatively connected to said warp beam knitting machine for terminating the machine operation when the limit switch is open, and wherein said limit switch is closed when said support arm is in an operative position, and said limit switch is open when said support arm is in the intermediate and inoperative positions.

9. The apparatus according to claim 8 wherein said support arm includes at least one stop member for engaging said lever arm and exerting a biasing force against said lever arm when said support arm is positioned in the operative position.

* * * * *

UNITED STATES PATENT AND TRADEMARK OFFICE
CERTIFICATE OF CORRECTION

PATENT NO. : 5,152,158
DATED : 6 October 1992
INVENTOR(S) : Rudi Wirth

It is certified that error appears in the above-identified patent and that said Letters Patent is hereby corrected as shown below:

Column 4, Line 2, please change "leVer" to read, --lever--.

Column 4, Line 34, please change "haVing" to read --having--.

Column 4, Line 58, please change "surfaoe" to read
--surface--.

Column 5, Line 14, please change "spaoinq" to read
--spacing--.

Column 5, Line 32, please change "meohanism" to read
--mechanism--.

Column 5, Line 41, please change "moVement" to read
--movement--.

Column 6, Line 9, please change "HoWeVer" to read
--however--.

Signed and Sealed this

Twenty-first Day of September, 1993

Attest:

BRUCE LEHMAN

Attesting Officer

Commissioner of Patents and Trademarks